United States Patent [19]

Ramisch

[11] 4,301,488

[45] Nov. 17, 1981

[54] TAPE CASSETTE

[75] Inventor: Reinhard Ramisch, Reichelsheim, Fed. Rep. of Germany

[73] Assignee: Friedrich W. König, Reichelsheim, Fed. Rep. of Germany

[21] Appl. No.: 51,000

[22] Filed: Jun. 22, 1979

[30] Foreign Application Priority Data

Feb. 19, 1979 [DE] Fed. Rep. of Germany ... 7904568[U]

[51] Int. Cl.³ .............................................. G11B 23/02
[52] U.S. Cl. .................................. 360/132; 360/96.1; 360/137; 242/199
[58] Field of Search ................ 360/132, 137, 73, 96.1; 242/55.19 A, 197–200, 201, 187; 116/118.61

[56] References Cited

U.S. PATENT DOCUMENTS 3,752,113  8/1973  Blechman .................. 360/132 X
3,884,430  5/1975  Martin ............................ 242/199

FOREIGN PATENT DOCUMENTS 2655180  8/1978  Fed. Rep. of Germany ...... 242/199

*Primary Examiner*—John H. Wolff
*Attorney, Agent, or Firm*—Michael J. Striker

[57] ABSTRACT

A tape cassette includes a hollow housing and guiding rollers for guiding a tape along a predetermined path within the housing. A stroboscope device is operatively connected with the tape for indicating the speed of movement of the latter.

5 Claims, 5 Drawing Figures

U.S. Patent     Nov. 17, 1981     4,301,488
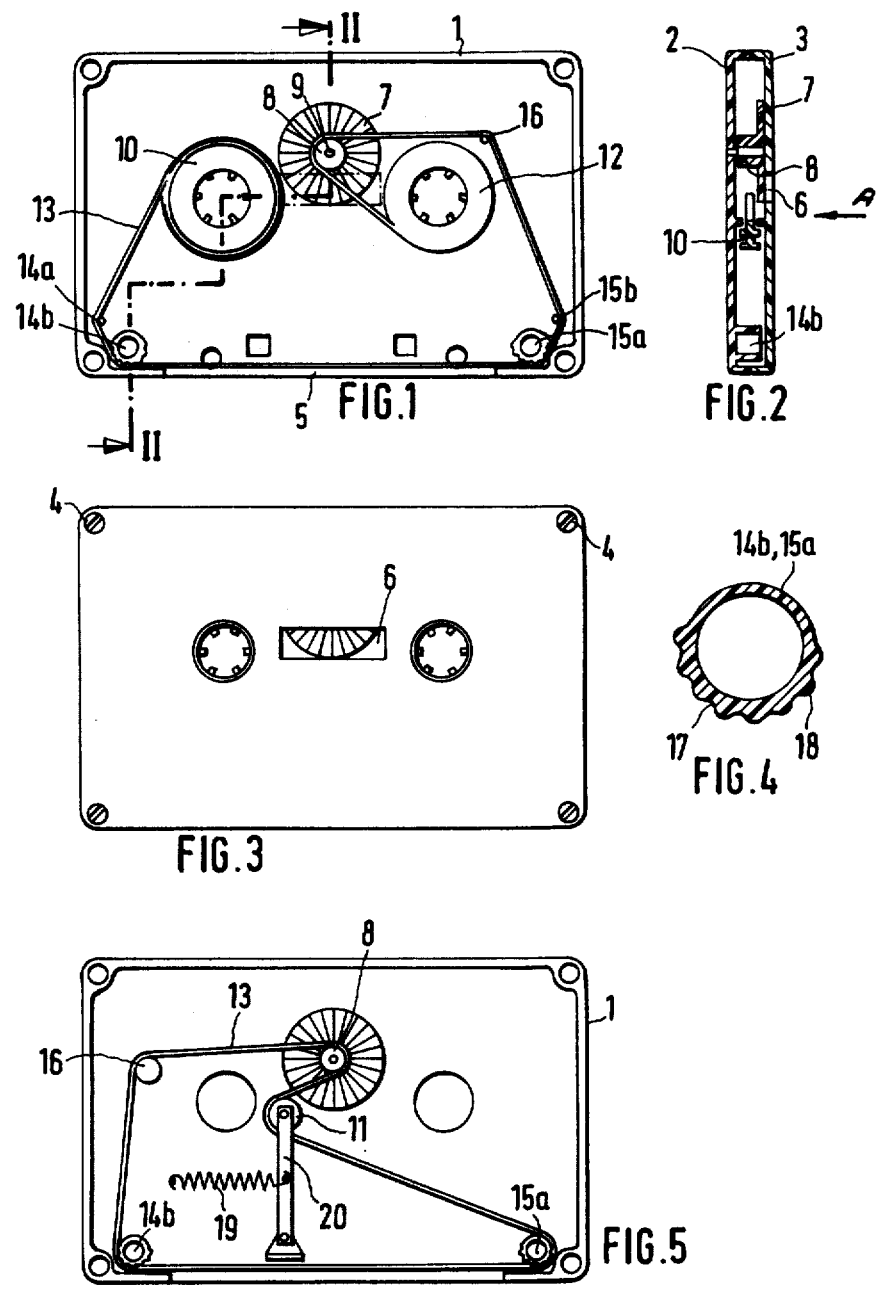

4,301,488

TAPE CASSETTE

BACKGROUND OF THE INVENTION

The present invention relates to tape cassette.

More particularly, the present invention is concerned with a tape cassette provided with a device for ascertaining the speed of the tape in the cassette.

In order to guarantee a high quality of recording and reproduction in cassette tape recorders the speed of the tape in such recorders has to be adjusted with a great deal of precision. However, to ensure the precise adjustment of the speed of the tape one has first to precisely determine the actual speed of the tape.

It is known to play on the recorder a tape which was recorded with a known constant frequency. The frequency obtained during playing such a tape is then compared with a predetermined standard frequency on an oscillograph. One can use, for example, a tape recorded with a frequency of 50 Hz to compare the obtained frequency (i.e. the frequency obtained when playing such a tape) with the main frequency of 50 Hz. However, such an arrangement is comparatively expensive and the process of measuring the speed of the tape with such an arrangement is very time-consuming.

It has also been suggested to determine the speed of the tape by means of a stroboscope disc. The stroboscope disc is provided in alternating sequence with white and black areas. In this case a light source flashes at a predetermined constant frequency and beams light upon the rotating disc. The light source may be a fluorescent strip lamp or a flashing lamp. If the rotational speed of the stroboscope disc is such that the time interval between two successive light flashes corresponds to the angular interval of adjacent white areas on the stroboscope disc (or to a multiple thereof), then the disc appears to be stationary. Should such relationship deviate from that discussed above (i.e. should the rotary speed become smaller or greater) then the stroboscope disc appears to move slowly in the one or the other direction.

The stroboscope effect is generally known for determining rotational speed. In the case of a tape recorder, the stroboscope disc is mounted directly on a playback shaft of the tape recorder. Obviously, should the playback shaft not be readily accessible, such an arrangement for measuring the speed of the tape becomes extremely complicated. On the other hand, different tape recorders obviously have different playback shafts of different diameters. Thus, though the peripheral speed of the playback shafts may be the same, the rotational speed of the same may vary significantly. Therefore, each stroboscope disc can be used only with one playback shaft having a particular diameter.

In order to measure the speed of the tape with a single stroboscope disc on various tape recorders having playback shafts of different diameters, it may be advisable to operatively connect the stroboscope disc directly to the tape to be tested so that the latter rotates the stroboscope disc. However, for this purpose it is necessary to conduct the tape, driven by the tape recorder, around a roller connected with the stroboscope disc. Such a constructive measure is very complicated even in the case of reel-to-reel tape recorders; in the case of cassette tape recorders it becomes almost impossible since the tape runs completely within the enclosed tape cassette.

SUMMARY OF THE INVENTION

It is a general object of the present invention to avoid the disadvantages of the prior art.

More particularly, it is an object of the present invention to provide a tape cassette with an arrangement for determining the speed of the tape moving within the cassette.

Another object of the present invention is to provide a tape cassette with an arrangement for determining the speed of the tape, which arrangement is operated in a simple and reliable manner.

Still another object of the present invention is to provide a tape cassette with an arrangement for determining the speed of the tape, which arrangement does not significantly increase the cost of the cassette per se.

In pursuance of these objects and others which will become apparent hereafter, one feature of the present invention resides in providing a tape cassette having a hollow housing, guiding means inside said housing for guiding a tape adapted to move along a predetermined path within said housing, and means operatively connected with the tape for indicating the speed of movement of the latter.

In accordance with another feature of the present invention said indicating means include a stroboscope disc fixedly connected to a stroboscope shaft which is mounted in the housing. The stroboscope shaft is rotated directly by the tape which is guided by said guiding means.

A lamp may be used for flashing, at a constant frequency, onto the stroboscope disc.

The housing has the usual opening arranged along the path of movement of the tape in the housing. Through this opening a portion of the tape is exposed outwardly of the housing and may engage a drive roller and a head of a tape recorder.

The tape travels along the predetermined path under a certain tension which ensures a friction engagement of the tape with a stroboscope shaft, which in turn results in rotation of the latter.

In yet another feature of the present invention the housing is provided with a window through which at least a portion of the stroboscope disc is visible.

It should be mentioned that the tape cassette of the present invention, provided with the above mentioned stroboscope disc, has overall dimensions which correspond (i.e. by no means exceed) the standards for recording tape cassettes and therefore can be inserted in any cassette tape recorder just as simply as a conventional tape cassette.

The tape rotates the stroboscope shaft which is connected (e.g. integrally) to the stroboscope disc so that any rotation of the shaft is immediately transmitted onto the stroboscope disc. The diameter of the stroboscope shaft (r.e. which is driven by the tape) and the graduation of the stroboscope disc may be so selected that the stroboscope disc appears to be stationary when illuminated by a fluorescent strip lamp or flashing lamp operated with the mains frequency of 50 Hz. If the stroboscope disc appears to move in the one or the other direction, the tape drive means of the tape recorder have to be correspondingly adjusted until the stroboscope disc again appears to be stationary.

In still another feature of the present invention, the guiding means may advantageously include two tape reels so that the tape is unwound from the one reel and is wound onto the other and vice versa. In contrast with a relatively short endless tape, which could also be used, it is possible to test the running mechanism of the tape recorder when the tape is wound as well as when the latter is unwound. In other words, it becomes possible to test the forward and reverse running of the tape.

In a further feature of the present invention, the guide means further include guide rollers for guiding the tape between the tape reels.

The tape is guided within the tape cassette around the guide rollers and the stroboscope shaft only with its inner surface which carries no coating, and therefore, is subject to particularly no wear (i.e. abrasion).

Such a feature eliminates any potential danger that the abraded material from the tape will accumulate on the stroboscope shaft which will lead to unavoidable increasing of the diameter of this shaft which will result in reducing the accuracy of measurement of the stroboscope disc.

Since the mechanical stresses on the tape during movement of the latter between the tape reels are relatively small, it becomes possible to select a tape having a thickness corresponding to that of the conventional tapes for the cassette tape recorders.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a plan view of a tape cassette according to the present invention, with a housing upper part removed to make the interior of the tape cassette and the components arranged therein visible;

FIG. 2 is a sectional view taken along the line II—II in FIG. 1;

FIG. 3 is a plan view of the tape cassette;

FIG. 4 is an enlarged sectional view of a guide roller; and

FIG. 5 is a plan view of another embodiment of the tape cassette shown in FIG. 1.

DESCRIPTION OF THE PREFERRED EMBODIMENTS

Referring now to the drawings and first to FIGS. 1-3 thereof, it may be seen that the reference numeral 1 designates a housing which includes a lower (i.e. the left if viewed in the direction of an arrow A) housing part 2 and an upper (i.e. the right if viewed in the direction of the arrow A) housing part 3 which are connected to each other at four corners thereof by means of screws 4. The housing 1 has, like any other conventional tape cassette housing, an opening 5 for a drive roller and for a pick-up head of a tape recorder. These elements are known per se and therefore do not require any detailed discussion or illustration.

An upper surface 3 of the housing 1 is provided with a window 6 through which a portion of a stroboscope disc 7 is visible. The stroboscope disc 7 is integrally connected with a stroboscope shaft 8. The stroboscope disc and shaft are made of synthetic plastic material for example by way of the injection molding process. The stroboscope shaft 8 is rotatably mounted on the housing 1 by means of a steel mounting pin 9. The stroboscope disc 7 carries a graduation consisting of black and white sectors (i.e. areas).

The housing 1 is further provided with a first tape hub 10 and a second tape hub 12 which are rotatable and connectable in a conventional manner with respective drive spindles (not shown) of the tape recorder.

A magnetic recording tape 13, the length of which may be selected to correspond to a playing time of 2 minutes, is conducted from the first tape hub 10 over two guide rollers 14a and 14b past the opening 5, over guide rollers 15a, 15b and 16, over the stroboscope shaft 8 to the second tape hub 12. When driven by the drive spindles of the tape recorder the recording tape 13 receives an adequate tension to ensure that the tape 13 rotates the stroboscope shaft 8 without any slip.

The graduation of the stroboscope 7 may include 33 segments which may be produced by e.g. screen printing. The diameter of the stroboscope shaft 8 amounts to 5 mm. less half the thickness of the tape 13. When the stroboscope disc 7 is illuminated through the window 6 with a fluorescent strip lamp (not shown) or a flashing lamp (not shown) operated at a frequency of 50 Hz and when the speed of the tape 13 is 4.76 cm/sec. the stroboscope disc 7 appears to be stationary. However, should the speed of the tape 13 deviate from that equal to 4.76 cm/sec., then the stroboscope disc 7 will immediately appear to rotate in one or the opposite direction.

In order to ensure adequate braking of the recording tape 13, the guide rollers 14b and 15a are provided with grooves 17 and projections 18 which are shown in FIG. 4. The window 6 constitutes an opening in the housing 1, covered by a transparent plate of synthetic plastic material which prevents any undesired damage of the stroboscope disc 7 or its unintentional braking.

The recording tape 13 contacts the guide rollers 14a, 14b, 15a, 15b and 16 and the stroboscope shaft 8 only with its inner side, that is the side which is not coated and therefore displays practically no wear. The tape 13 contacts the stroboscope shaft 8 over about 160° (or at least over 120°).

The tape hubs 10 and 12 may be operatively connected to one another. In this case, adequate tension on the tape is generated by a resiliently mounted guide roller. Such an arrangement is illustrated in FIG. 5, wherein two tape hubs form one single unit which is constituted by the stroboscope shaft 8. The recording tape 13 runs over the stroboscope shaft 8 and forms an endless loop. The tape 13 is adequately tensioned by a resiliently mounted guide roller 11. The guide roller 11, which can also be replaced by a guide pin, is mounted on an arm 20 which is pivotably mounted in the cassette housing 1 and connected with a spring 19.

The tape 13 is magnetized in both running directions with a constant sound frequency, for example of 6.3 kHz, so that it becomes possible to monitor the head gap position of the recording-playback head of the tape recorder. Thus, the adjustment work necessary for this purpose can be carried out directly during adjustment of the recording tape speed.

In order to prevent involuntary erasure of the recording tape the conventional erasure tabs (i.e. usually located in the cassette housing) have been removed from the housing 1.

It will be understood that each of the elements described above, or two or more together, may also find a useful application in other types of a tape cassette differing from the types described above.

While the invention has been illustrated and described as embodied in a tape cassette, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tape cassette, comprising a housing accommodating a magnetic tape, said housing having a window on one of its sides; guiding means including two tape reels rotatably mounted in said housing and adapted to alternately wind and unwind the tape, and a plurality of guide rollers fixedly mounted in said housing and adapted to guide the tape with a predetermined speed in a predetermined path between said reels when the tape is in its working position in a tape recorder; and stroboscope means mounted in said housing and comprising a shaft rotatably supported in said shaft and a stroboscope disc secured to said housing, said tape being arranged to at least partially engage said shaft to move over said shaft in said predetermined path, said stroboscope disc being mounted in the housing so that at least a portion thereof is visible through said window whereby any deviation from said predetermined speed of said tape is indicated in said window, at least a pair of guide rollers being formed with a plurality of alternating ribs and grooves extending transverse to the direction of movement of the tape and providing means thereby adapted to contact the tape for retarding the tape in its movement in said working position.

2. A cassette as defined in claim 1, wherein the tape engages the stroboscope shaft over at least 120°.

3. A cassette as defined in claim 1, wherein the tape engages the stroboscope shaft over 160°.

4. The cassette as defined in claim 1, wherein said housing is formed with an opening at a lateral side thereof, an outer surface of said tape being exposed through said opening.

5. A cassette as defined in claim 4, wherein said shaft is in contact with the inner surface of said tape.

* * * * *